United States Patent [19]
Bojeryd

[11] Patent Number: 5,946,622
[45] Date of Patent: Aug. 31, 1999

[54] METHOD AND APPARATUS FOR PROVIDING CELLULAR TELEPHONE SERVICE TO A MACRO-CELL AND PICO-CELL WITHIN A BUILDING USING SHARED EQUIPMENT

[75] Inventor: Nils Johan Bojeryd, Richardson, Tex.

[73] Assignee: Ericsson Inc., Research Triangle Park, N.C.

[21] Appl. No.: 08/752,253

[22] Filed: Nov. 19, 1996

[51] Int. Cl.⁶ .................................................. H04Q 7/36
[52] U.S. Cl. .......................................... 455/444; 455/449
[58] Field of Search .................................. 455/422, 426, 455/444, 446, 447, 448, 449

[56] References Cited

U.S. PATENT DOCUMENTS

| | | | |
|---|---|---|---|
| 4,771,448 | 9/1988 | Koohgoli et al. | 455/450 |
| 4,790,000 | 12/1988 | Kinoshita | 455/449 |
| 5,142,691 | 8/1992 | Freeburg et al. | 455/38.2 |
| 5,210,788 | 5/1993 | Nilssen | 455/462 |
| 5,235,632 | 8/1993 | Raith | 455/449 |
| 5,282,239 | 1/1994 | Yokoi et al. | 455/465 |
| 5,303,287 | 4/1994 | Laborde | 455/426 |
| 5,345,499 | 9/1994 | Benveniste | 455/449 |
| 5,349,631 | 9/1994 | Lee | 455/463 |
| 5,353,332 | 10/1994 | Raith et al. | 455/455 |
| 5,463,673 | 10/1995 | Herscovici | 455/446 |
| 5,548,806 | 8/1996 | Yamaguchi et al. | 455/444 |
| 5,594,782 | 1/1997 | Zicker et al. | 455/426 |
| 5,761,619 | 6/1998 | Danne et al. | 455/422 |

FOREIGN PATENT DOCUMENTS

| | | |
|---|---|---|
| 0 452 290 | 3/1991 | European Pat. Off. . |
| 0 729 282 | 2/1996 | European Pat. Off. . |
| WO 96/23370 | 8/1996 | WIPO . |

OTHER PUBLICATIONS

PCT Search Report, Aug. 14, 1998, PCT/US 97/21073.
*Patent Search Review–Indoor Hierarchical Cell*; Ericsson Internal Publication; RG/X–96:443; Jul. 29, 1996; by Nils Bojeryd; 2 pp.

*Primary Examiner*—Willis R. Wolfe
*Attorney, Agent, or Firm*—Jenkens & Gilchrist, P.C.

[57] ABSTRACT

The present invention is an apparatus and method for providing cellular telephone service to a pico-cell located within a building and extending cellular telephone service from a macro-cell located outside the building to inside the building. A first set of transceivers provide cellular telephone service to the macro-cell and a second set of transceivers provide cellular telephone service to the pico-cell. A series of combiners which combine multiple radio frequency signals into a single radio frequency signal and splitters which replicate a single radio frequency signal into multiple copies of the same radio frequency signal are used to connect both sets of transceivers to a common plurality of antennas located within the building.

10 Claims, 5 Drawing Sheets

METHOD AND APPARATUS FOR PROVIDING CELLULAR TELEPHONE SERVICE TO A MACRO-CELL AND PICO-CELL WITHIN A BUILDING USING SHARED EQUIPMENT

BACKGROUND OF THE INVENTION

1. Technical Field of the Invention

The present invention pertains in general to the planning and implementation of cell sites within a cellular telephone network, and more particularly, to providing pico-cell coverage within a building and extending coverage from a macro-cell located outside the building to inside the building using shared equipment.

2. Description of Related Art

Cellular telephone service is becoming increasingly ubiquitous with subscribers expecting uninterrupted coverage throughout a service area. Frequently, however, subscribers encounter disruptions in cellular telephone service as they enter a blind spot where the propagation of radio waves is inhibited by a physical obstruction. One location where this disruption in service frequently occurs is within a building where cellular telephone coverage is either spotty or nonexistent. To provide uninterrupted cellular telephone service within a building, cellular telephone planners incorporate a pico-cell located within the building in addition to a macro-cell which is located outside the building. In designing the pico-cell, the cellular telephone provider deliberately creates the pico-cell to be distinct from the macro-cell by assigning it a separate set of radio frequencies. Thus, a cellular telephone user who is using a cellular telephone prior to entering the building is serviced by the macro-cell located outside the building. Upon entering the building, a handoff of the cellular telephone call is made from the macro-cell to the pico-cell with the pico-cell servicing the cellular telephone user while inside the building.

In some situations, such as in airports and high-rise office buildings, the pico-cell can experience great capacity demands when a large number of cellular telephone users attempt to use the system at the same time. These locations are referred to as hot spots. In these areas, the cellular telephone provider needs to increase capacity to ensure that the increased demand is met. It would be advantageous therefore, to extend the macro-cell coverage of a cellular telephone network present outside a building to inside the building which is also serviced by a pico-cell in order to meet peak capacity demands. Furthermore, it would be advantageous to extend the macro-cell coverage inside the building by sharing the equipment used by the pico-cell.

SUMMARY OF THE INVENTION

The present invention extends cellular telephone service from a macro-cell located outside a building to inside the building while at the same time providing cellular telephone service via separate radio frequencies associated with a pico-cell located within the building. A series of combiners which combine radio frequency transmissions and splitters which replicate radio frequency transmissions, allow the use of the pico-cell antennas for both pico-cell and macro-cell coverage. In one embodiment of the present invention, transceivers used to provide cellular telephone service for the macro-cell and transceivers used to provide cellular telephone service for the pico-cell share a common base station and communication link to the cellular telephone network. In a second embodiment of the present invention, the transceivers transmitting on frequencies associated with a macro-cell provide cellular telephone service only within the building and communicate with a remotely located base station assigned to the macro-cell via a repeater.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
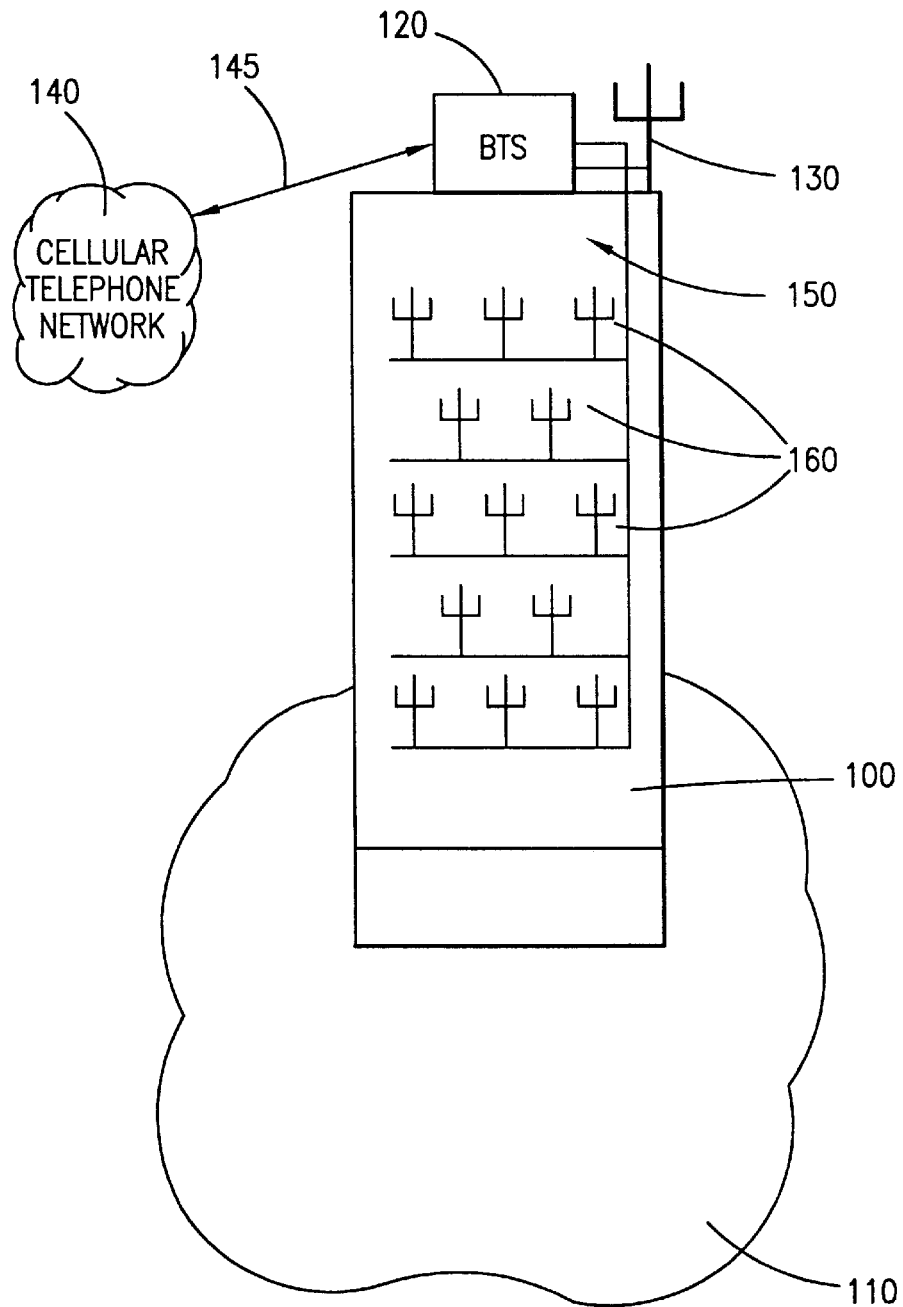
FIG. 1 depicts a building containing a pico-cell located within a macro-cell service area.

Referring now to FIG. 1, there is illustrated a building 100 located in a macro-cell 110 of a cellular telephone network 140. The macro-cell 110 is serviced by a base station 120 which is connected to an external antenna 130 and is further connected to the cellular telephone network 140 via communication link 145. Located within the building 100 is a pico-cell service area 150. The pico-cell is serviced by base station 120 and a plurality of antennas 160 located within the building 100. The present invention extends the macro-cell 110 coverage provided externally via antenna 130 into the pico-cell service area 150 utilizing the same plurality of antennas 160.

Figure 2:
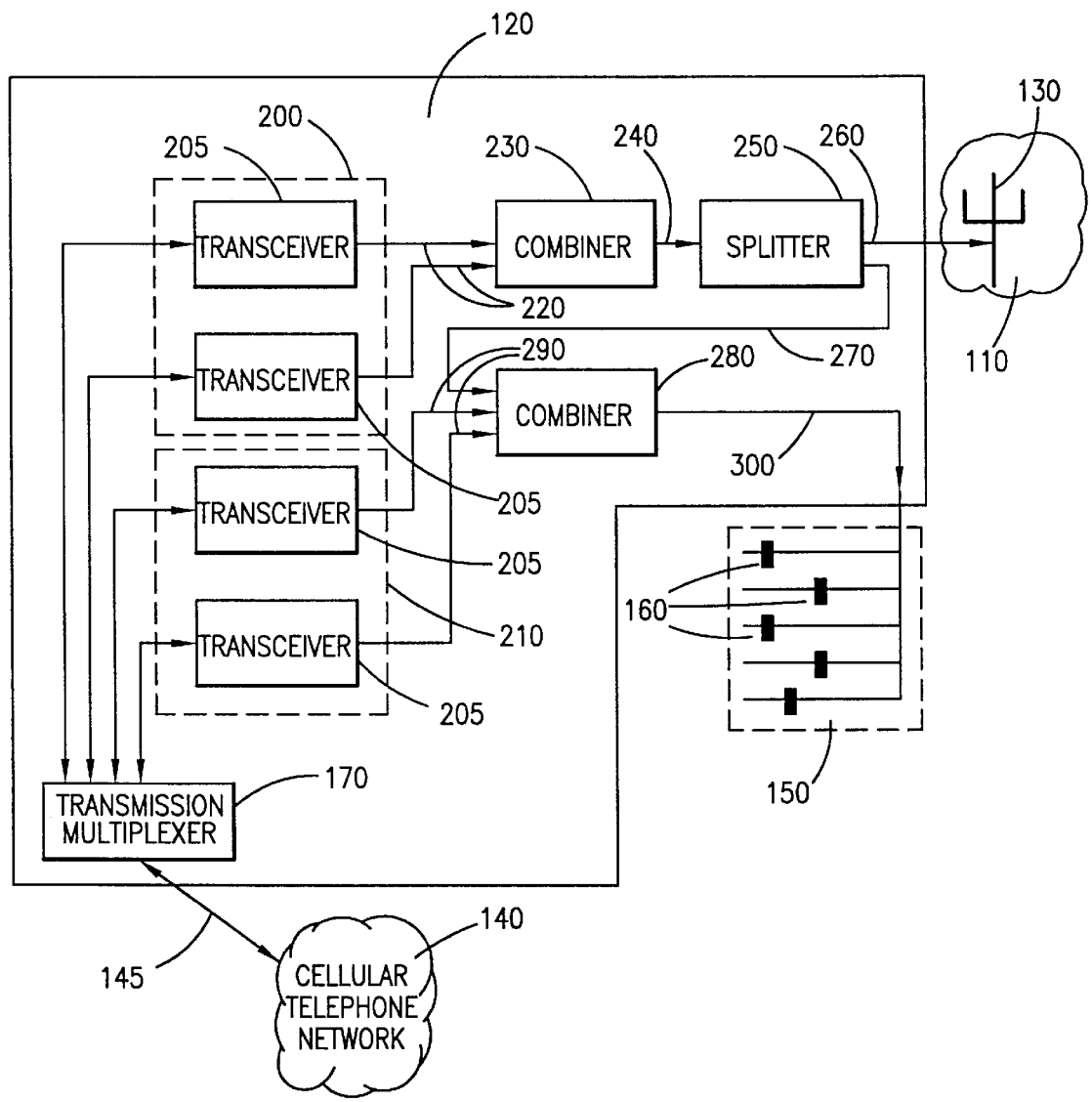
FIG. 2 is a block diagram of a cellular communications system illustrating a transmitting path for a first embodiment of the present invention.

Referring additionally now to FIG. 2, there is illustrated in connection with a block diagram of the cellular system, the transmitting path for a first embodiment of the present invention. A first set 200 of transceivers, comprising one or more transceivers 205, provides cellular telephone service to a macro-cell service area 110. The first set 200 of transceivers 205 is connected to the cellular telephone network 140 via a transmission multiplexer 170 and communication link 145. A second set 210 of transceivers, consisting of one or more transceivers 205, provides cellular telephone service to a pico-cell 150 located within the building 100. The second set 210 of transceivers 205 is connected to the cellular telephone network 140 via the transmission multiplexer 170 and communication link 145. The outputs 220 of the first set 200 of transceivers 205 are provided as inputs to a combiner 230. The combiner 230 combines the transmitter output signals 220 to create a single combined output signal 240. The combined output signal 240 is provided as an input to splitter 250 which replicates the combined output signal 240. A first copy 260 of the combined output signal 240 is provided to the antenna 130 located external to the building 100 and provides cellular telephone service to macro-cell service area 110. A second copy 270 of the combined output signal 240 is provided as an input to a second combiner 280. The second combiner 280 also has as inputs the output signals 290 from the set 210 of transceivers 205 which provide cellular telephone service to pico-cell 150. The combiner 280 combines the second copy 270 of the first combined output signal 240 with the transmitter output signals 290 to create a single combined output signal 300. The combined output signal 300 is connected to the plurality of antennas 160 located within building 100 to establish combined pico-cell 150 and macro-cell 110 coverage within the building 100.

When a cellular telephone is operated outside the building 100 but within the macro-cell 110, it receives cellular telephone service from the base station 120 via antenna 130. As the cellular telephone moves inside the building 100, and the transmitted signal from antenna 130 begins to fade, the cellular telephone continues to receive transmission from base station 120 via the plurality of antennas 160.

Figure 3:
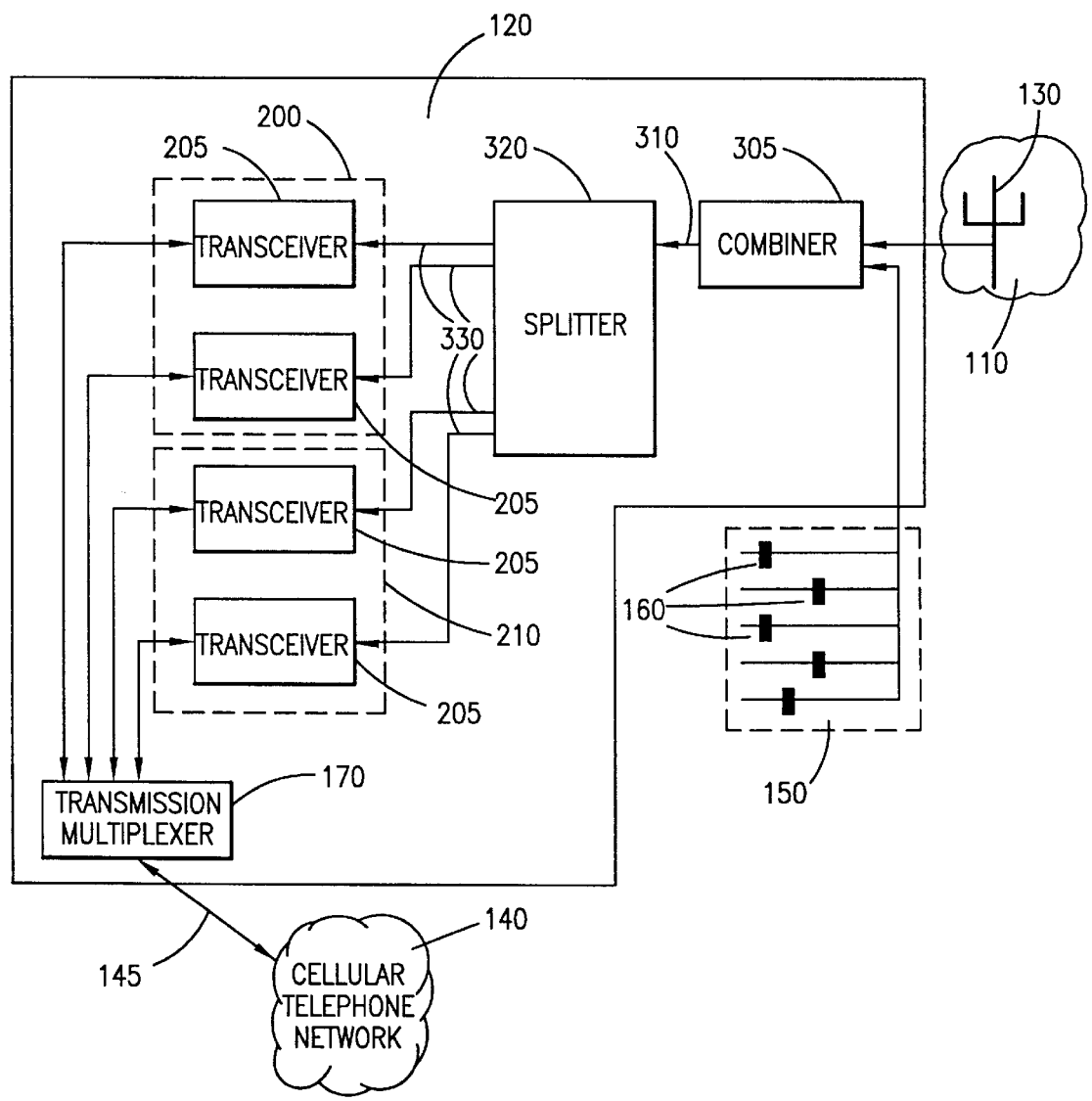
FIG. 3 is a block diagram of a cellular communications system illustrating a receiving path for a first embodiment of the present invention.

Referring additionally now to FIG. 3, there is illustrated in connection with a block diagram of the cellular system, a receiving path for a first embodiment of the present invention. A first set 200 of transceivers comprising one or more transceivers 205 is connected to the cellular telephone network 140 via the transmission multiplexer 170 and communication link 145. The first set 200 of transceivers 205 provides cellular telephone service to macro-cell service area 110. A second set 210 of transceivers comprised of one or more transceivers 205 is connected to the cellular telephone network 140 via the transmission multiplexer 170 and communication link 145. The second set 210 of transceivers 205 provides cellular telephone service to pico-cell service area 150 located within the building 100. Signals transmitted from cellular telephones located within the macro-cell service area 110 are received by antenna 130 and provided as an input to a combiner 300. Signals transmitted from cellular telephones located in the pico-cell 150 located within the building 100 are received by the plurality of antennas 160 and provided as an additional input to combiner 305. The combiner 305 combines the received signal from antenna 130 with received signal from the plurality of antennas 160 to create a single combined output signal 310. A splitter 320 replicates the combined output signal 310 to create multiple copies 330 of the combined output signal 310. The multiple copies 330 are provided as inputs to the transceivers 205.

When a cellular is operated outside the building 100, but within the macro-cell service area 110, it receives cellular telephone service from the base station 120 via antenna 130. As the cellular telephone moves inside the building 100, transmissions are picked up by the plurality of antennas 160 and the signal is received by the set 200 of transceivers 205 via combiner 305 and splitter 320 and communication is maintained with the cellular telephone network 140.

By combining the transceiver transmitting path of FIG. 2 and the transceiver receiving path of FIG. 3, full duplex cellular telephone service is provided to macro-cell service area 110 and pico-cell service area 150. Pico-cell coverage is only provided to the pico-cell service area 150 located within the building 100, while macro-cell coverage is provided to both the pico-cell service area 150 located within the building 100 and to the macro-cell service area 110 located outside of the building 100. In this first embodiment of the present invention, macro-cell coverage and pico-cell coverage is provided by sharing the plurality of antennas 160, the base station 120, and the communication link 145 to the cellular telephone network 140.

Figure 4:
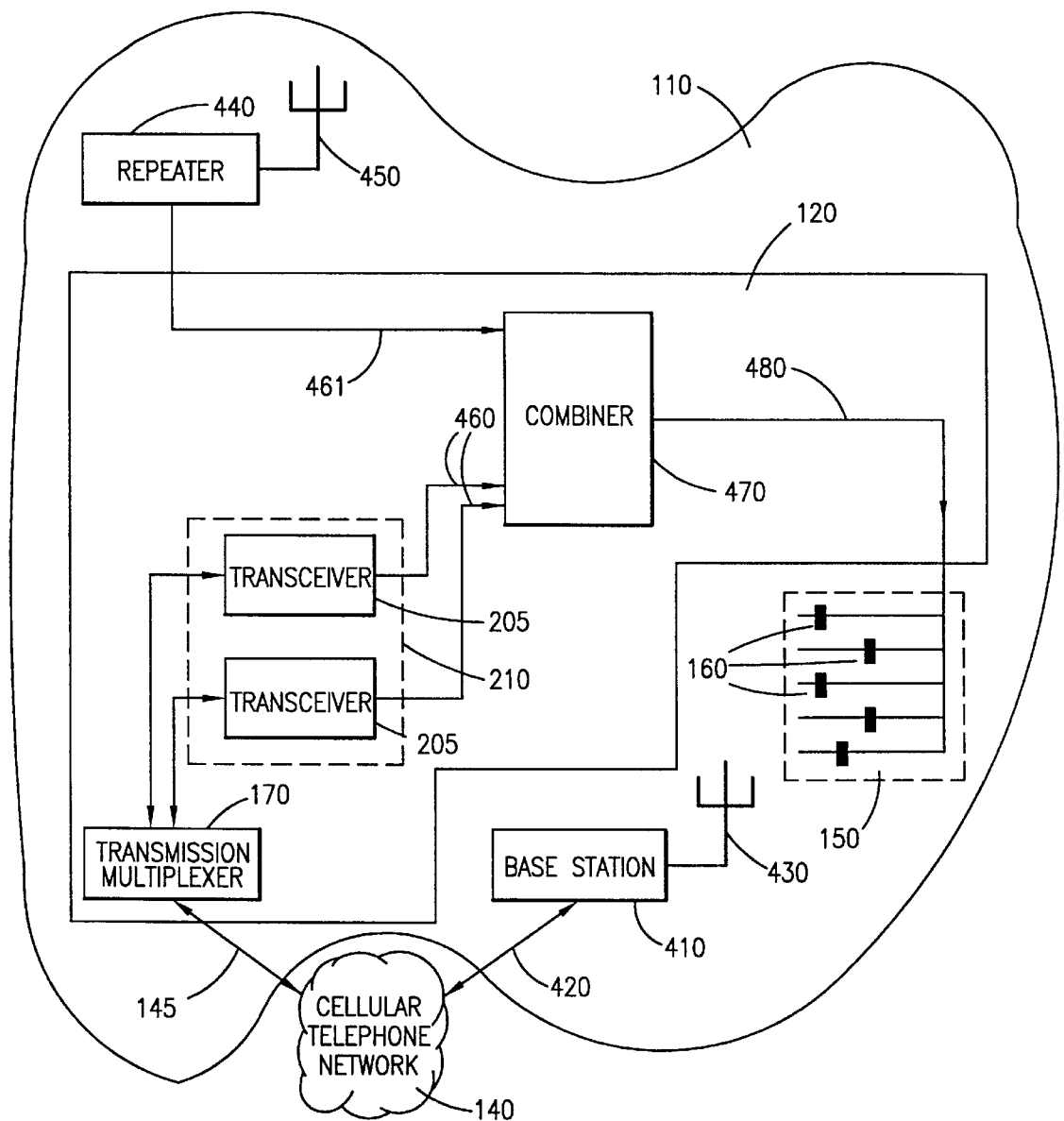
FIG. 4 is a block diagram of a cellular communications system illustrating a transmitting path for a second embodiment of the present invention.

Referring additionally now to FIG. 4, there is illustrated in connection with a block diagram of the cellular system, a transmitting path for a second embodiment of the present invention. As in the first embodiment of the present invention, the second embodiment of the present invention includes a set 210 of transceivers comprised of one or more transceivers 205 for providing cellular telephone service to the pico-cell service area 150. The set 210 of transceivers 205 communicate with the cellular telephone network 140 via the transmission multiplexer 170 and communication link 145. The second embodiment of the present invention also includes a repeater 440 connected to an antenna 450 for providing cellular telephone service over radio frequencies associated with the macro-cell 110. Unlike the first embodiment, however, the repeater 440 does not provide cellular telephone service in the macro-cell service area 110 located outside of the building 100. The repeater 440 does, however, provide macro-cell coverage in the pico-cell service area 150 located within the building 100. A remotely located base station 410 communicates with the cellular telephone network 140 via communication link 420. The base station 410 is connected to antenna 430 for providing cellular telephone service to the macro-cell service area 110 outside of the building 100. The repeater 440 receives wideband signal transmissions from the remotely located base station 410 and generates an output signal 461 which is supplied as an input to combiner 470. The combiner 470 combines all of the transmitter output signals 460 and the repeater output signal 461 into a single combined output signal 480, which is communicated to the plurality of antennas 160 located within the building 100. When a cellular telephone is operated outside the building 100 but within the macro-cell service area 110, it receives cellular telephone service from the base station 410 via antenna 430. At the same time, the repeater 440 picks-up transmissions from the base station 410 via antenna 450 and retransmits these signals inside the building 100 via the plurality of antennas 160. As the cellular telephone moves inside the building 100 and the transmitted signal from antenna 430 begins to fade, the cellular telephone continues to receive the transmissions from base station 410 through repeater 440 and via the plurality of antennas 160.

Figure 5:
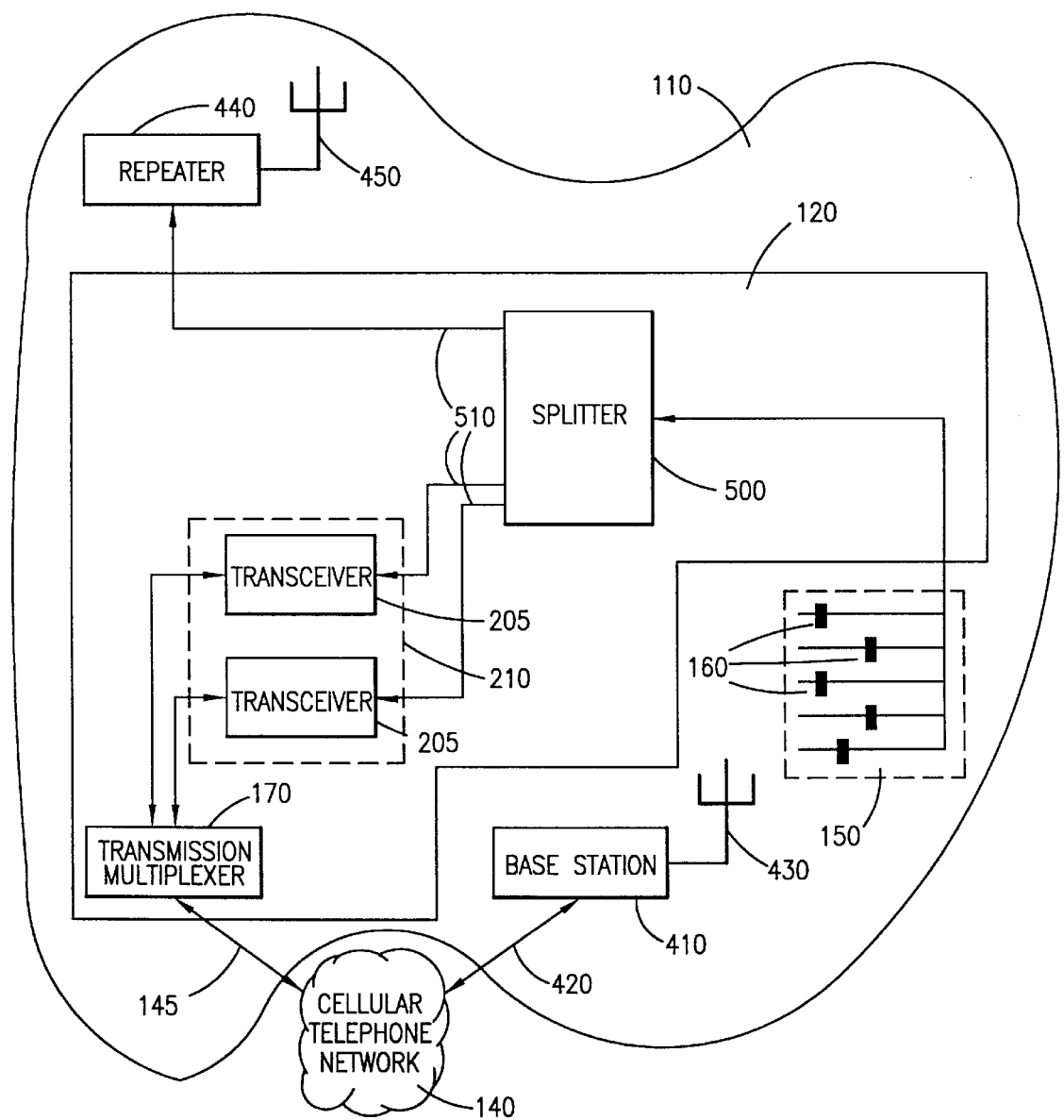
FIG. 5 is a block diagram of a cellular communications system illustrating a receiving path for a second embodiment of the present invention.

Referring additionally now to FIG. 5, there is illustrated in connection with a block diagram of the cellular system, a receiving path for a second embodiment of the present invention. As with the first embodiment of the present invention, the second embodiment includes a set 210 of transceivers comprised of one or more transceivers 205. The set 210 of transceivers 205 communicate with the cellular telephone network 140 via the transmission multiplexer 170 and communication link 145. The set 210 of transceivers 205 provides cellular telephone coverage to the pico-cell service area 150 located within the building 100 via a plurality of antennas 160. The second embodiment of the present invention also includes a repeater 440 connected to an antenna 450 for providing cellular telephone service over radio frequencies associated with the macro-cell 110.

Unlike the first embodiment, however, the repeater 440 does not provide cellular telephone service in the macro-cell service area 110 located outside the building 100. The repeater 440 does, however, provide macro-cell coverage in the pico-cell service area 150 located within the building 100. A remotely located base station 410 communicates with the cellular telephone network 140 via communication link 420. The base station 410 is connected to antenna 430 for providing cellular telephone service to the macro-cell service area 110. The repeater 440 receives signals 510 from the splitter 500 and transmits them to the remotely located base station 410 via the antenna 450.

Transmissions from cellular telephones located within the building 100 are picked up by the plurality of antennas 160 and are input into a splitter 500. The splitter 500 replicates the signal and provides multiple copies 510 to each of the transceivers 205 and to the repeater 440.

When a cellular telephone is operated outside the building 100, but within the macro-cell service area 110, it receives cellular telephone service from the base station 410 via antenna 430. As the cellular telephone moves inside the building 100, transmissions from the cellular telephone are picked up by the plurality of antennas 160 and the signal is received by the repeater 440 via splitter 500. The repeater 440 retransmits the signal outside the building 100 via antenna 450. The retransmitted signal is received by base station 410 via antenna 430 and communication is established with the cellular telephone network 140 through the repeater 440 and via communication link 420.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An apparatus for providing cellular telephone service within a building comprising:

means for establishing cellular telephone service in a pico-cell located within the building, wherein the pico-cell is allocated use of a first group of frequencies;

means for extending cellular telephone service from a macro-cell located outside the building to inside the building, wherein the macro-cell is allocated use of a second group of frequencies;

a shared antenna located within the building for transmitting and receiving signals both on the first group of frequencies for the pico-cell located within the building and on the second group of frequencies for the macro-cell; and means for integrating the pico-cell and macro-cell cellular telephone service onto the shared antenna located within the building.

2. The apparatus recited in claim 1, wherein the means for establishing cellular telephone service to the pico-cell located within the building comprises:

a base station connected to a cellular telephone network; and a plurality of transceivers connected to the base station for communicating with the cellular telephone network and the plurality of transceivers further connected to the shared antenna located within the building for communicating with and providing pico-cell coverage to cellular telephones located within the building.

3. The apparatus recited in claim 1, wherein the means for extending cellular telephone service from the macro-cell located outside the building to inside the building comprises:

a base station connected to a cellular telephone network; and a plurality of transceivers connected to the base station for communicating with the cellular telephone network, the plurality of transceivers further connected to an antenna located outside the building for communicating with and providing macro-cell coverage to cellular telephones located outside the building, and the plurality of transceivers further connected to the shared antenna located within the building for communicating with and providing macro-cell coverage to cellular telephones located within the building.

4. The apparatus recited in claim 1, wherein the means for extending cellular telephone service from the macro-cell located outside the building to inside the building comprises, a repeater communicating with a cellular telephone network via a remotely located base station, the repeater connected to the shared antenna located within the building for communicating with and providing macro-cell coverage to cellular telephones located within the building.

5. An apparatus for transmitting to cellular telephones located inside and outside a building comprising:

a first set of transceivers comprised of one or more transceivers connected to a cellular telephone network, each transceiver in the first set generating a transmitter output signal associated with a macro-cell located outside the building;

a second set of transceivers comprised of one or more transceivers connected to the cellular telephone network, each transceiver in the second set generating a transmitter output signal associated with a pico-cell located within the building;

a first combiner for combining the transmitter output signals from the first set to produce a first combined output signal;

a splitter for replicating the first combined output signal and creating a first and second copy of the first combined output signal, the first copy of the signal output to an antenna for providing macro-cell coverage outside the building; and a second combiner for combining the transmitter output signals from the second set and the second copy of the first combined output signal to produce a second combined output signal output to an antenna located within the building for providing pico-cell coverage within the building and extending the macro-cell coverage into the building.

6. An apparatus for receiving transmissions from cellular telephones located inside and outside a building comprising:

an antenna located outside the building for receiving macro-cell transmissions from cellular telephones located outside the building;

an antenna located within the building for receiving macro-cell and pico-cell transmissions from cellular telephones located inside the building;

a combiner for combining the received transmissions from the antenna located outside the building and the received transmissions from the antenna located within the building, the combiner producing a combined output signal;

a splitter for replicating the combined output signal and creating a first and second copy of the combined output signal;

a first set of transceivers comprised of one or more transceivers connected to a cellular telephone network, the first set of transceivers receiving macro-cell transmissions from cellular telephones located outside and inside the building via the first copy of the combined output signal; and a second set of transceivers comprised of one or more transceivers connected to a cellular telephone network, the second set of transceivers receiving pico-cell transmissions from cellular telephones located within the building via the second copy of the combined output signal.

7. An apparatus for transmitting to cellular telephones located inside a building comprising:

a repeater connected to a cellular telephone network via a remotely located base station, the repeater generating an output signal associated with a macro-cell located outside the building;

a set of transceivers comprised of one or more transceivers connected to a cellular telephone network, each transceiver in the set generating an output signal associated with a pico-cell located within the building; and a combiner for combining the output signals from the repeater and set of transceivers to produce a combined output signal output to an antenna located within the building for providing pico-cell coverage within the building and extending the macro-cell coverage into the building.

8. An apparatus for receiving transmissions from cellular telephones located inside a building comprising:

an antenna located within the building for receiving macro-cell and pico-cell transmissions from cellular telephones located inside the building;

a splitter for reproducing the received transmissions from the antenna and creating a first and second copy of the received transmission;

a repeater connected to a cellular telephone network via a remotely located base station, the repeater receiving macro-cell transmissions from cellular telephones located inside the building via the first copy of the received transmissions; and a set of transceivers comprised of one or more transceivers connected to a cellular telephone network, the set of transceivers receiving pico-cell transmissions from cellular telephones located within the building via the second copy of the combined output signal.

9. A method for transmitting to cellular telephones located inside and outside a building comprising the steps of:

combining transmitter outputs from each transceiver in a first set of transceivers associated with a macro-cell to produce a first combined output signal;

replicating the first combined output signal to produce a first and second copy of the first combined output signal;

transmitting the first copy of the first combined output signal to cellular telephones located outside the building associated with the macro-cell on an antenna located outside the building;

combining transmitter outputs from each transceiver in a second set of transceivers associated with a pico-cell and the second copy of the first combined output signal to produce a second combined output signal; and transmitting the second combined output signal to cellular telephones located inside the building associated with the pico-cell and the macro-cell on an antenna located inside the building.

10. A method for receiving transmissions from cellular telephones located inside and outside a building comprising the steps of:

receiving macro-cell transmissions from cellular telephones located outside the building on an antenna located outside the building;

receiving macro-cell and pico-cell transmissions from cellular telephones located inside the building on an antenna located inside the building;

combining macro-cell transmissions received on the antenna located outside the building with macro-cell and pico-cell transmissions received on the antenna located inside the building to produce a combined output signal; and replicating the combined output signal to produce a copy of the combined output signal for each transceiver in a first set of transceivers associated with the macro-cell and for each transceiver in a second set of transceivers associated with the pico-cell.

* * * * *